US012371941B2

(12) United States Patent
Spofford

(10) Patent No.: US 12,371,941 B2
(45) **Date of Patent: *Jul. 29, 2025**

(54) SELF-ALIGNING JAMB JACK SCREW WITH PARTIAL SPHERE

(71) Applicant: Charles James Spofford, Greenfield, MA (US)

(72) Inventor: Charles James Spofford, Greenfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/989,207

(22) Filed: Dec. 20, 2024

(65) Prior Publication Data

US 2025/0116152 A1 Apr. 10, 2025

Related U.S. Application Data

(63) Continuation-in-part of application No. 17/994,372, filed on Nov. 27, 2022, now Pat. No. 12,173,516.

(60) Provisional application No. 63/372,079, filed on Mar. 11, 2022.

(51) Int. Cl.
*E06B 1/60* (2006.01)
*E04F 21/00* (2006.01)

(52) U.S. Cl.
CPC ........ *E06B 1/6076* (2013.01); *E04F 21/0015* (2013.01)

(58) Field of Classification Search
CPC ...... E06B 1/6069; E06B 1/603; E06B 1/6015; E06B 1/6046; E06B 1/6061; E06B 1/6076; E06B 1/62; E06B 2001/622; E04F 21/0015; E04F 21/0023
See application file for complete search history.

(56) References Cited

U.S. PATENT DOCUMENTS

| | | | | | |
|---|---|---|---|---|---|
| 1,914,736 | A * | 6/1933 | Coutu | F16L 11/18 | 285/271 |
| 3,054,321 | A * | 9/1962 | Macchia | H01R 35/02 | 403/56 |
| 3,224,152 | A * | 12/1965 | Evans | E06B 1/6076 | 52/211 |
| 3,571,996 | A * | 3/1971 | Braswell | E06B 3/9885 | 49/505 |
| 3,869,839 | A * | 3/1975 | Johnson | E06B 1/6069 | 49/420 |
| 4,038,801 | A * | 8/1977 | Busch | E06B 1/603 | 52/698 |
| 4,070,121 | A * | 1/1978 | Graham | F16C 11/0604 | 403/132 |

(Continued)

*Primary Examiner* — Kyle J. Walraed-Sullivan
(74) *Attorney, Agent, or Firm* — Richard A. Baker, Jr.

(57) ABSTRACT

A self-aligning jamb jack apparatus with a cylindrical threaded adjustment component that has adjustment component threads on the exterior wall and smooth surface on the interior walls, the cylindrical threaded adjustment component extending through a cylinder with a smooth exterior to a ball (or cut-off sphere), the smooth surface extending through the cylinder and the ball (or cut-off sphere). The jamb jack apparatus also has a platform base with a socket configured to encompass the ball (or cut-off sphere) such that the platform base pivots around the ball (or cut-off sphere). The self-aligning jamb jack apparatus is installed in a door or window jamb (or any other appliance) to connect and regulate the space between the jamb and the rough framing.

20 Claims, 5 Drawing Sheets

(56) References Cited

U.S. PATENT DOCUMENTS

| | | | | | |
|---|---|---|---|---|---|
| 4,226,066 | A * | 10/1980 | Persson | E06B 1/64 | 49/504 |
| 4,453,346 | A * | 6/1984 | Powell | E06B 1/6076 | 49/404 |
| 4,486,134 | A * | 12/1984 | White | F16B 5/0283 | 411/383 |
| 4,846,622 | A * | 7/1989 | Lien | E06B 1/6076 | 411/389 |
| 4,927,305 | A * | 5/1990 | Peterson, Jr. | F16B 31/025 | 411/432 |
| 4,930,959 | A * | 6/1990 | Jagelid | F16B 5/0283 | 411/533 |
| 5,174,703 | A * | 12/1992 | White | F16B 5/0283 | 411/970 |
| 5,507,534 | A * | 4/1996 | Reifenberger | F16L 27/04 | 285/271 |
| 5,655,343 | A * | 8/1997 | Seals | E06B 1/6069 | 52/745.15 |
| 5,692,350 | A * | 12/1997 | Murphy, Jr. | E06B 1/6084 | 411/533 |
| 5,975,490 | A * | 11/1999 | Essman | F16L 37/28 | 285/261 |
| 6,167,663 | B1 * | 1/2001 | Nakamoto | F16B 5/0283 | 52/204.56 |
| 6,826,878 | B1 * | 12/2004 | Rovtar | E06B 1/6076 | 411/383 |
| 7,784,734 | B2 * | 8/2010 | Christman | B64C 25/16 | 244/102 R |
| 8,881,464 | B1 * | 11/2014 | Huckeba | E06B 1/6046 | 49/489.1 |
| 10,352,089 | B1 * | 7/2019 | Lawrence | F16B 25/0031 | |
| 10,465,432 | B1 * | 11/2019 | Brannon | E06B 1/6076 | |
| 11,746,587 | B1 * | 9/2023 | Hildreth | E06B 1/52 | 52/217 |
| 2005/0132532 | A1 * | 6/2005 | Campbell | E05D 15/0682 | 16/2.4 |
| 2008/0075556 | A1 * | 3/2008 | Smith | F16B 5/0233 | 411/379 |
| 2008/0226420 | A1 * | 9/2008 | Huang | F16B 5/0283 | 411/352 |
| 2011/0101133 | A1 * | 5/2011 | Espy | B05B 15/654 | 239/587.4 |
| 2011/0217112 | A1 * | 9/2011 | Seol | F16C 11/06 | 29/509 |
| 2014/0110934 | A1 * | 4/2014 | Berkness | F16L 21/02 | 285/231 |
| 2014/0215939 | A1 * | 8/2014 | Gosling | E04B 1/388 | 52/211 |
| 2014/0260008 | A1 * | 9/2014 | Eis | E04F 21/0015 | 52/749.1 |
| 2015/0337890 | A1 * | 11/2015 | Faccioli | F16C 11/106 | 403/122 |
| 2016/0061368 | A1 * | 3/2016 | Carlberg | B29C 45/14754 | 285/146.1 |
| 2017/0058851 | A1 * | 3/2017 | Colvin | F16L 27/04 | |
| 2018/0266172 | A1 * | 9/2018 | Wray | E05F 17/004 | |
| 2020/0386260 | A1 * | 12/2020 | Marchant, Jr. | F16C 11/0604 | |
| 2021/0270046 | A1 * | 9/2021 | Wermers | E04F 21/0023 | |
| 2021/0293336 | A1 * | 9/2021 | Wallace | F16L 27/04 | |
| 2023/0010152 | A1 * | 1/2023 | Nakasone | E05B 83/30 | |
| 2023/0279947 | A1 * | 9/2023 | Andersen | F16L 27/04 | 92/178 |

* cited by examiner

SELF-ALIGNING JAMB JACK SCREW WITH PARTIAL SPHERE

CROSS REFERENCE TO RELATED APPLICATIONS

This document is a continuation-in-part of U.S. patent application Ser. No. 17/994,372, filed on Nov. 27, 2022, by inventor Charles James Spofford, now U.S. Pat. No. 12,173,516, issued on Dec. 24, 2024. U.S. patent application Ser. No. 17/994,372 is a non-provisional application for which claims priority under 35 U.S.C. § 119, to U.S. Provisional Patent Application No. 63/372,079, filed Feb. 14, 2022, entitled "Self-Aligning Jamb Jack Screw," the entire content of the above non-provisional patent application and provisional patent application are incorporated herein by reference in their entirety.

BACKGROUND

Technical Field

The present application is in the field of construction, and more particularly to devices for adjusting and aligning a jamb assembly within a structural opening and/or with another jamb assembly.

Description of the Related Art

The inventions described herein are an improvement to any of the existing ways to mount windows and doors that have been disclosed and/or offered to date.

Although there are many different designs of Jamb Jack Screws, this set of inventions is presented to resolve many of the limitations of the prior attempts and current offerings. The self-aligning functionality afforded by the ball and platform base addresses many of the challenges of aligning an appliance (in this case a window or door unit) into an opening in a wall regardless of the rough framing's condition as it pertains to being Level, Plumb, Square and/or True.

In addition, the design provides an opportunity to adjust the jamb jack screw at a future date from completely inside the room without the need to remove interior casings. This is beneficial when the rough framing members swell or contract as a result of a change in moisture content.

The present inventions eliminate the issues articulated above as well as other issues with the currently known products.

SUMMARY OF THE INVENTIONS

A self-aligning jamb jack apparatus is described here. The jamb jack apparatus includes a cylindrical threaded adjustment component with adjustment component threads on the exterior wall and a smooth surface on the interior walls, the cylindrical threaded adjustment component extending through a cylinder with a smooth exterior to a ball, the smooth surface extending through the cylinder and the ball. The apparatus also includes a platform base with a socket configured to encompass the ball such that the platform base pivots around the ball.

In some embodiments, the apparatus also includes a cylindrical threaded base component with guide threads on the interior walls, the guide threads aligned to accept the adjustment component threads. A flange could be mechanically attached to the cylindrical threaded base component at one end of the cylindrical threaded base component, the flange extending outward, the flange including a flat surface perpendicular to the cylindrical threaded base component. The flange could have a hole in the flat surface.

In some cases, the cylindrical threaded base component has exterior threads. The cylindrical threaded adjustment component, the cylinder, and the ball could be a single piece of steel. The platform base, the cylindrical threaded adjustment component, the cylinder, and the ball are 3-D printed steel. The platform base could be brass.

The jamb jack apparatus could also include a door jamb, the cylindrical threaded base component mechanically connected to the door jamb.

The jamb jack apparatus could also include a window jamb, the cylindrical threaded adjustment component mechanically connected to the window jamb.

The jamb jack apparatus could also include an appliance jamb, the cylindrical threaded base component mechanically connected to the appliance jamb.

Alternatively, the jamb jack apparatus includes at least three parts: (1) a cylindrical threaded base component with guide threads on the interior walls, the guide threads aligned to accept adjustment component threads, an adjustment component assembly; (2) the adjustment component assembly comprising a cylindrical threaded adjustment component with the adjustment component threads on the exterior wall and a smooth surface on the interior walls, a cylinder mechanically connected to the cylindrical threaded adjustment component on one end of the cylindrical threaded adjustment component, and a ball, mechanically connected to the cylinder, the smooth surface extending through the ball; and (3) a platform base with a socket configured to encompass the ball such that the platform base pivots around the ball.

In some embodiments, the platform base is a rectangular box shape. A flange could be mechanically attached to the cylindrical threaded base component at one end of the cylindrical threaded base component, the flange extending outward, the flange including a flat surface perpendicular to the cylindrical threaded base component and the flange could have a hole in the flat surface. The cylindrical threaded base component could have exterior threads. The cylindrical threaded adjustment component, the cylinder, and the ball could be a single piece of brass. The platform base, the cylindrical threaded adjustment component, the cylinder, and the ball could be 3-D printed steel. In some embodiments, the platform base is iron. The jamb jack apparatus could also include a doorjamb, the cylindrical threaded base component mechanically connected to the door jamb. The jamb jack apparatus could also include a window jamb, the cylindrical threaded base component mechanically connected to the window jamb.

An apparatus is described here that includes a cylindrical threaded adjustment component with a cylindrical surface on an interior wall and an adjustment component threads on an exterior wall, the cylindrical threaded adjustment component extending through a cylinder with an exterior surface to a cut-off sphere, the cylindrical surface extending through the cylinder and the cut-off sphere. The apparatus also includes a platform base with a socket configured to encompass the cut-off sphere such that the platform base pivots around the cut-off sphere.

In some embodiments, the apparatus also includes a cylindrical threaded base component with guide threads on base component interior walls, the guide threads aligned to accept the adjustment component threads.

In some embodiments, the apparatus also includes a flange that is mechanically attached to the cylindrical threaded base component at one end of the cylindrical threaded base component, the flange extending outward, the flange including a flat surface perpendicular to the cylindrical threaded base component.

In some embodiments, the flange has a hole in the flat surface of the flange.

In some embodiments, the cylindrical threaded base component has exterior threads.

In some embodiments, the cylindrical threaded adjustment component, the cylinder, and the cut-off sphere are a single piece of steel.

In some embodiments, the platform base, the cylindrical threaded adjustment component, the cylinder, and the cut-off sphere are 3-D printed plastic.

In some embodiments, the platform base is nylon.

In some embodiments, the apparatus also includes a door jamb, the cylindrical threaded base component mechanically connected to the door jamb.

In some embodiments, the apparatus also includes a window jamb, the cylindrical threaded adjustment component mechanically connected to the window jamb.

This document also describes an apparatus that includes a cylindrical threaded base component with guide threads on a guide interior wall, the guide threads aligned to accept adjustment component threads. The apparatus also includes an adjustment component assembly, the adjustment component assembly made up of a cylindrical threaded adjustment component with the adjustment component threads on an adjustment component exterior wall and a cylindrical surface on an adjustment component interior wall, a cylinder mechanically connected to the cylindrical threaded adjustment component on one end of the cylindrical threaded adjustment component, and a cut-off sphere, mechanically connected to the cylinder, the cylindrical surface extending through the cut-off sphere. The apparatus also includes a platform base with a socket configured to encompass the cut-off sphere such that the platform base pivots around the cut-off sphere.

In some embodiments, the platform base is a rectangular box shape.

In some embodiments, a flange is mechanically attached to the cylindrical threaded base component at one end of the cylindrical threaded base component, the flange extending outward, the flange including a flat surface perpendicular to the cylindrical threaded base component.

In some embodiments, the cylindrical threaded base component has exterior threads.

In some embodiments, the cylindrical threaded adjustment component, the cylinder, and the cut-off sphere are a single piece of brass.

In some embodiments, the platform base, the cylindrical threaded adjustment component, the cylinder, and the cut-off sphere are 3-D printed steel.

In some embodiments, the platform base is iron.

In some embodiments, the apparatus also includes a door jamb, the cylindrical threaded base component mechanically connected to the door jamb.

In some embodiments, the apparatus also includes a window jamb, the cylindrical threaded base component mechanically connected to the window jamb.

In some embodiments, the apparatus also includes an appliance jamb, the cylindrical threaded base component mechanically connected to the appliance jamb.

DETAILED DESCRIPTION OF THE INVENTIONS

The Jamb Jack Device

Figure 1:
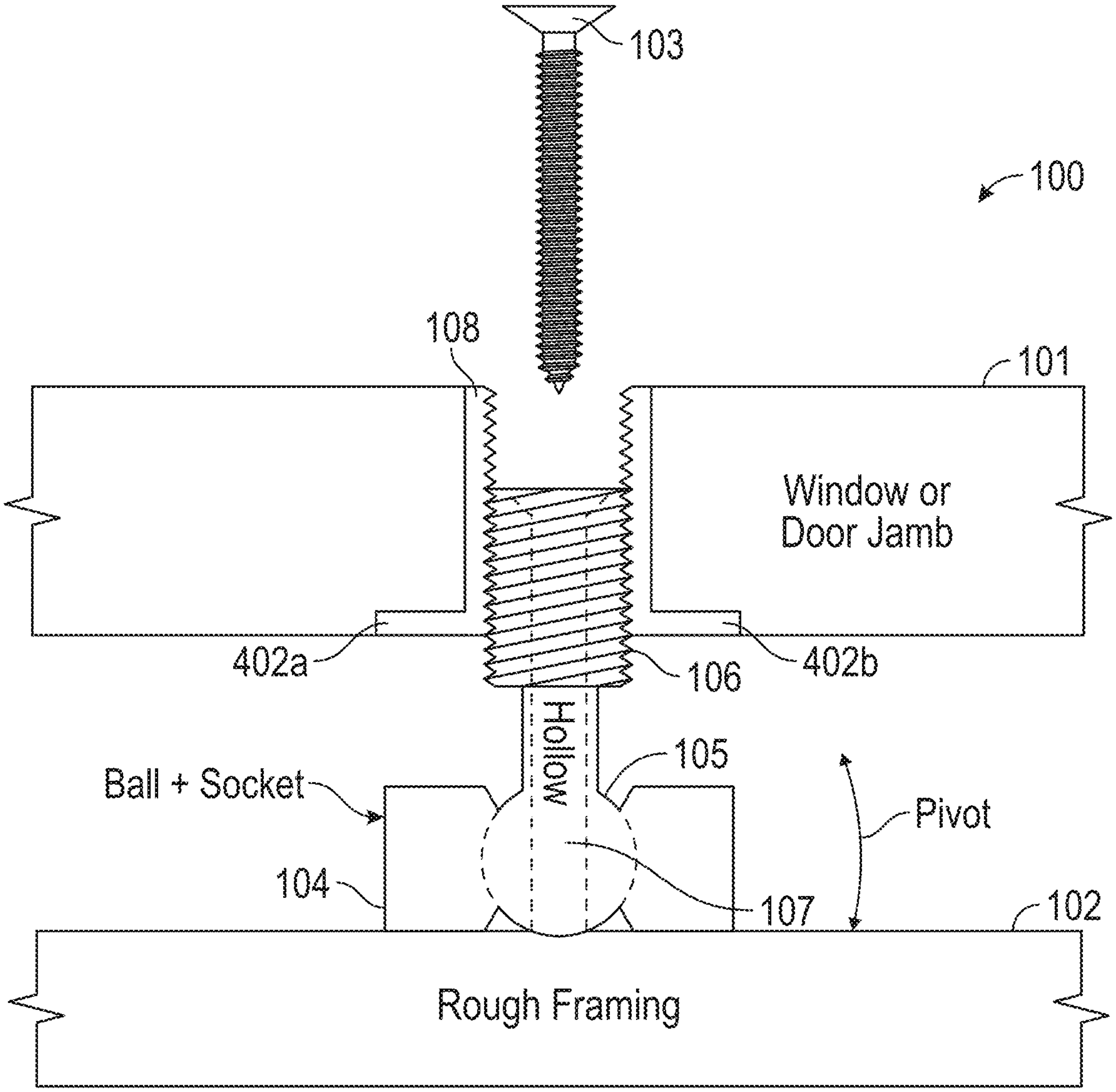
FIG. 1 shows a cutaway view of the jamb jack as installed in a window or door.

FIG. 1 shows the jamb jack assembly 100. The jamb jack assembly 100 has self-aligning functionality that will provide an equal distribution of force perpendicular to the window or door unit 101 jamb regardless of any rough framing twisting, facing, or rough framing geometry that is out of level, plumb, square, or true. This is done by placing a platform base 104 against the rough framing 102, and screwing a fastener 103 through an adjustment component 106 and ball 105 assembly, located in the window or doorjamb 101, using a smooth hollow 107 to accept the fastener 103. The jamb 101 could also be an appliance jamb.

Figure 4A:
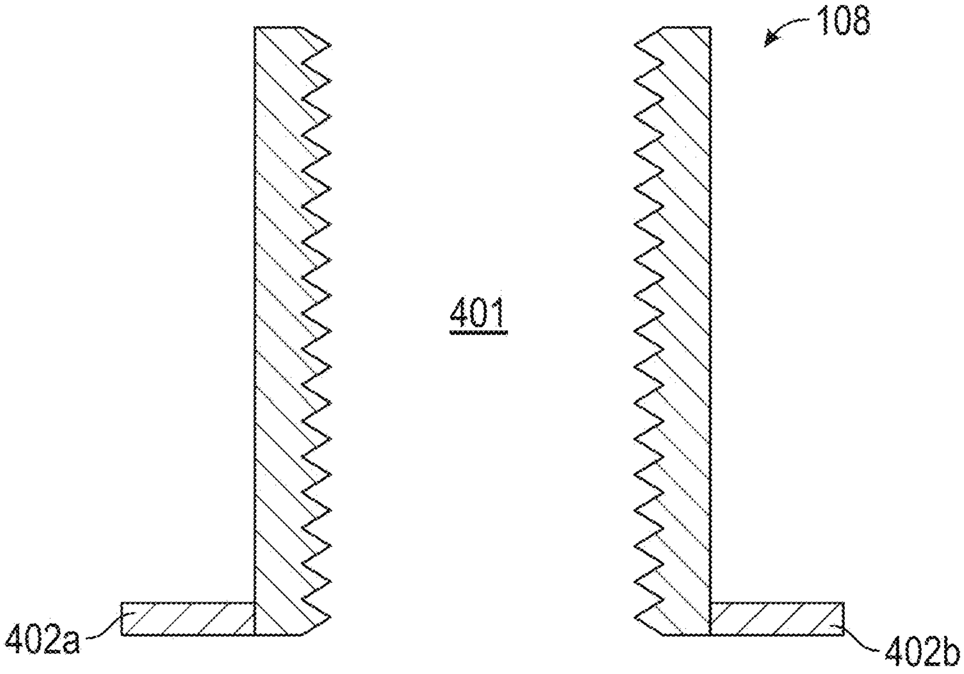
FIG. 4*a* shows a cut-away view of the threaded base component.
Figure 4B:
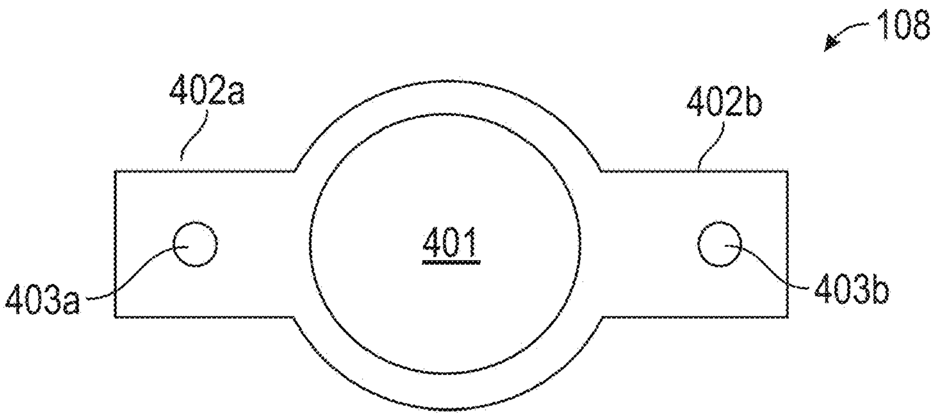
FIG. 4*b* shows a bottom view of the threaded base component.

The base component 108 is placed in a window or door jamb 101, as seen in FIGS. 4*a* and 4*b*. The base component 108 could be attached to the window or door jamb 101 with friction, perhaps by forcing the base component 108 into the hole with a hammer. In another embodiment, the base component 108 could be attached with an adhesive or could be screwed into the hole in the window or door jamb 101. In another embodiment, the base component 108 is placed into the hole and attached to the window or door jamb 101 by inserting screws through screw holes 403*a*, 403*b* in the first and second flange 402*a*,402*b* (shown in FIGS. 4*a* and 4*b*) into the window or door jamb 101. The base component 108 is hollow 401 and cylindrical in shape, and has a smooth or threaded exterior. The interior shape of the base component 108 is a threaded cylinder for receiving the threaded adjustment component 106. The base component 108 could be made of steel, iron, brass, bronze, plastic, or similar material. In one embodiment, shown in FIGS. 4*a* and 4*b*, the base component 108 has first and second flanges 402*a*, 402*b* (although the number of flanges could vary without detracting from the inventions, and in some embodiments, a single circular flange surrounds the base component 108). Each flange 402*a*, 402*b* could have a screw hole 403*a*, 403*b*. A screw could be inserted in the screw holes 403*a*, 403*b* to attach the base component 108 to the window or door jamb 101. In some embodiments, the base component 108 has no threading on the inside, but base component 108 is made of a material that allows the adjustment component 106 to self-tap into the base component 108. In some embodiments, the base component 108 could have an outside diameter of 50 mm and an inside threaded diameter of 44 mm. The height of the base component 108 could be 40-70 mm.

Figure 2A:
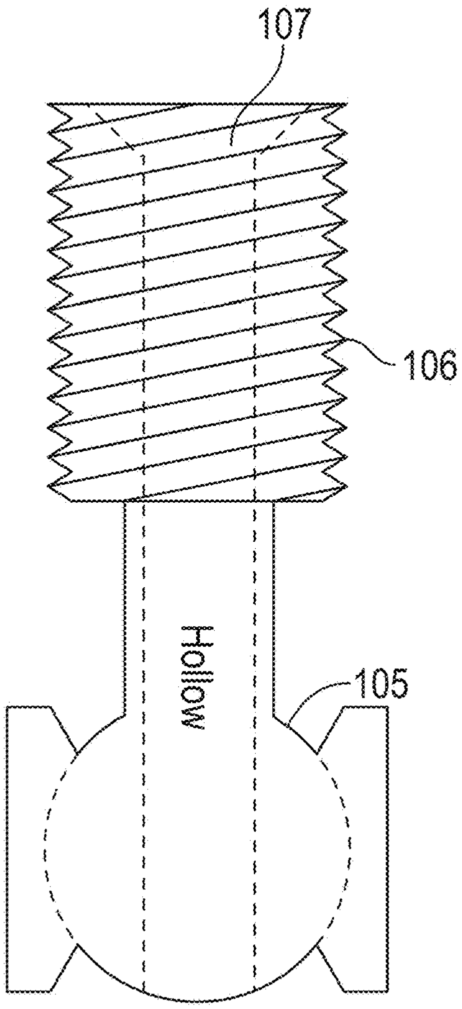
FIG. 2*a* shows a side view of the adjustment component and ball assembly.
Figure 2B:
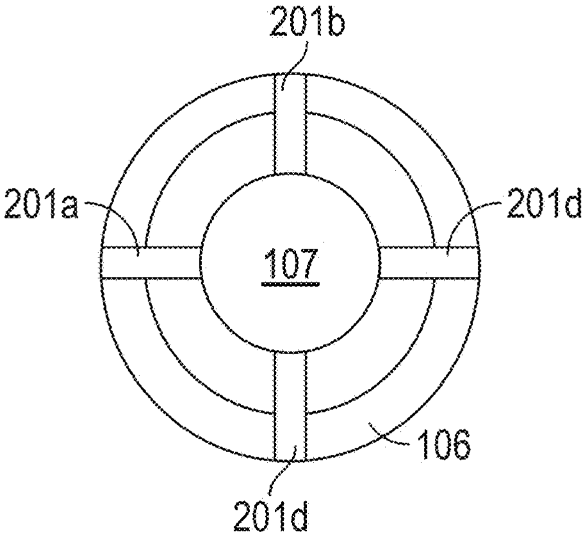
FIG. 2*b* shows a top view of the adjustment component.

The adjustment component 106 and ball 105 assembly screws into the base component 108. The adjustment component 106 and ball 105 assembly is hollow 107 as seen in FIG. 2*b*. The top portion of the adjustment component 106 and ball 105 assembly is the adjustment component 106. The adjustment component 106 is threaded on the outside, as seen in FIG. 2*a*. The adjustment component 106 is attached to the ball 105. The attachment could be made by being molded together, machined out of a single piece, glued together with an adhesive, welded together, 3-D printed as a single part, or through other attachment means. The ball 105 is a sphere attached to the adjustment component 106, either directly or via a cylinder, as shown in FIG. 2*a*. The ball 105 (and the cylinder and adjustment component 106) has a cylindrical, hollow hole 107 in the center. The hollow 107 receives the fastener 103, which passes through adjustment component 106 to be screwed into the rough framing 102. The adjustment component 106 and ball 105 assembly could be made of steel, iron, brass, bronze, plastic, or similar material. In some embodiments, the diameter of hollow 107 could be 6 mm or less. In some embodiments, the distance between the ball 105 and the adjustable component 106 could be 12 mm. In some embodiments, the ball 105 could have a 25 mm diameter. In some embodiments, the outside diameter of the adjustable component 106 could be 44 mm and the thickness of the adjustable component 106 could be 19 mm.

In some embodiments, the hollow 107 is threaded. The threads in the hollow 107 could be through the entire adjustment component 106 and ball 105 assembly in some embodiments or could be partially threaded.

In some embodiments, the top of the adjustment component 106 is countersunk so that the fastener 103 is flush with the top of the adjustment component 106 as it passes through the hollow 107.

In some embodiments, the adjustment component 106 is screwed directly into the window or door jamb 101, without the base component 108.

The fastener 103 could be a machine screw, a bolt, or any other type of screw type device. The fastener could be made of steel, iron, brass, bronze, plastic, or similar material. The top of the fastener could be a Phillips head, straight head, hex head, socket head, etc. The threading for the fastener 103 could be the entire length of the shaft in one embodiment, or the fastener 103 could be only partially threaded with the threading at the end to fasten to the rough framing 102.

As seen in FIG. 2*b*, the top of the adjustment component 106 could be countersunk to accept the fastener 103. The countersinking could be beveled down to the hollow 107.

In some embodiments, the adjustment component 106 could include grooves 201*a*,201*b*,201*c*,201*d* to accept a Philips head screwdriver so that the adjustment component 106 can be screwed into the door jamb 101.

Figure 3A:
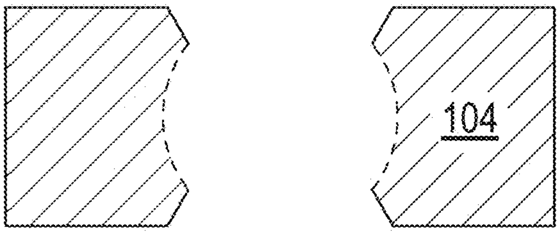
FIG. 3*a* shows a cutaway view of the platform base.
Figure 3B:
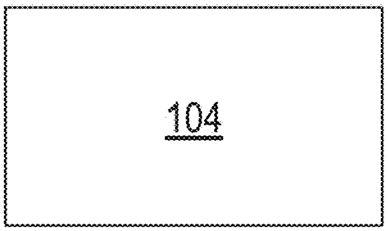
FIG. 3*b* shows a side view of the platform base.
Figure 3C:
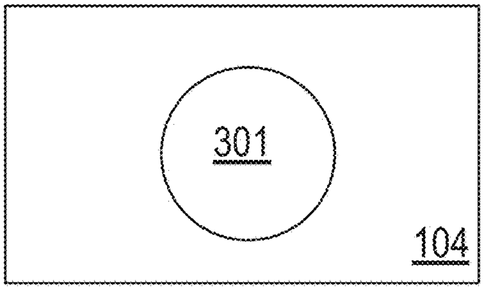
FIG. 3*c* shows a top view of the platform base.

The platform base 104 is seen in FIGS. 3*a*, 3*b*, and 3*c*. The platform base 104 has a socket 301 that envelopes the ball 105 in such a manner that the platform base 104 can be rotated around the ball 105. In some embodiments, the platform base 104 can be stiffly manipulated to move around the ball 105, but not so loose that gravity will move the platform base 104. The platform base 104 could be 3D printed (in plastic, nylon, steel, etc) around the ball 105, the platform base 104 could be molded around the ball 105, or the platform base 104 could be adhered together from a plurality of parts. The adhesion could be with an adhesive, with screws (or bolts), welded (metal or plastic), with a band around the pieces, or with similar attachment mechanisms. The platform base 104 could be made of steel, iron, brass, bronze, plastic, white metal, nylon, or similar material. FIG. 3*b* shows the side view of the platform base, and FIG. 3*c* shows the top view, including the hole for the ball 105 to attach. The bottom of the platform base 104 could be open as shown in FIG. 3*a* or closed. The platform base 104 could be self-aligning.

The platform base 104 could be a rectangular box shape in some embodiments. In other embodiments, the platform base 104 could be round with a flat, concave, or convex surface contacting the rough framing 102.

FIG. 4*a* is a cutaway view of the base component 108. This figure shows the first and second flanges 402*a*,402*b* for attaching the base component 108 to the door jamb 101. The threading for accepting the adjustment component 106 can be seen inside of the opening 401. The threading of the adjustment component 106 may be paired to accept the threading of the adjustment component 106.

FIG. 4*b* shows a top-down view of the base component 108. The base component 108 is a cylinder surrounding an opening 401. The base component 108 may have a first and second flanges 402*a*,402*b*. In other embodiments, first and second flanges 402*a*,402*b* are a circle surrounding the base component 108 rather than the two tab-like first and second flanges 402*a*,403*b* shown in FIG. 4*b*. The first and second flanges 402*a*,402*b* could have screw holes 403*a*,403*b* in some embodiments. In other embodiments, first and second flanges 402*a*,403*b* could have nails attached so that the flanges could be hammered into the door jamb 101. In other embodiments, the screw holes 403*a*, 403*b* could be on the edge of the first and second flanges 402*a*,402*b*, and may not be complete holes, but only semicircles. In still other embodiments, first and second flanges 402*a*,402*b* could be attached to door jamb 101 with adhesives or other attachment mechanisms. In some embodiments, the platform base 104 could be 10 mm thick.

Figure 5:
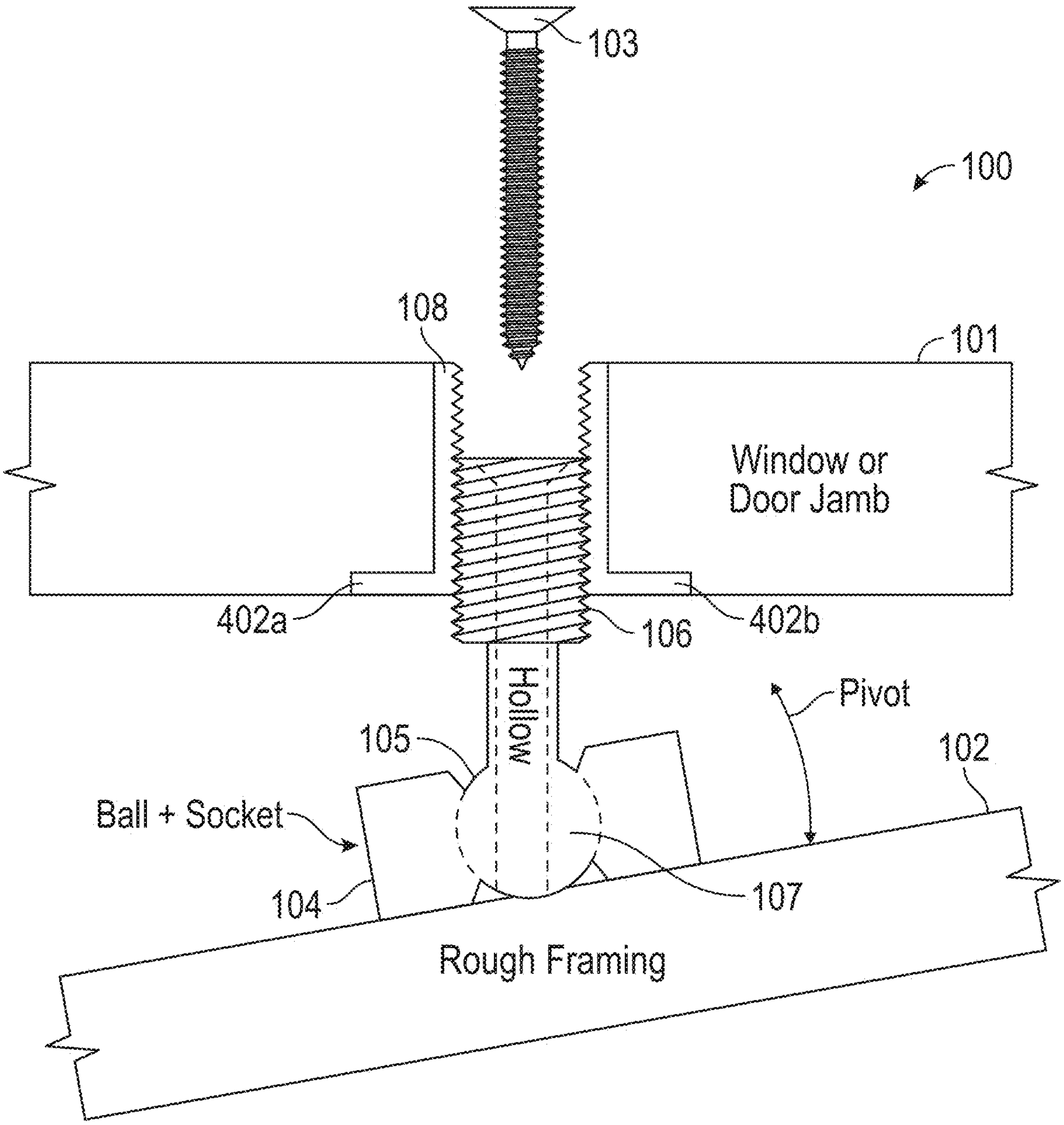
FIG. 5 shows a cutaway view of the jamb jack as installed in a window or door with framing that is not parallel.

FIG. 5 shows a view of FIG. 1 where the rough framing 102 is not parallel to the door jamb 101. In this situation, the platform base 104 rotates to parallel to the rough framing 102, rotating around the ball 105. The fastener 103 is inserted through the hollow 107 and is driven into the rough framing 102 at an angle.

Figure 6:
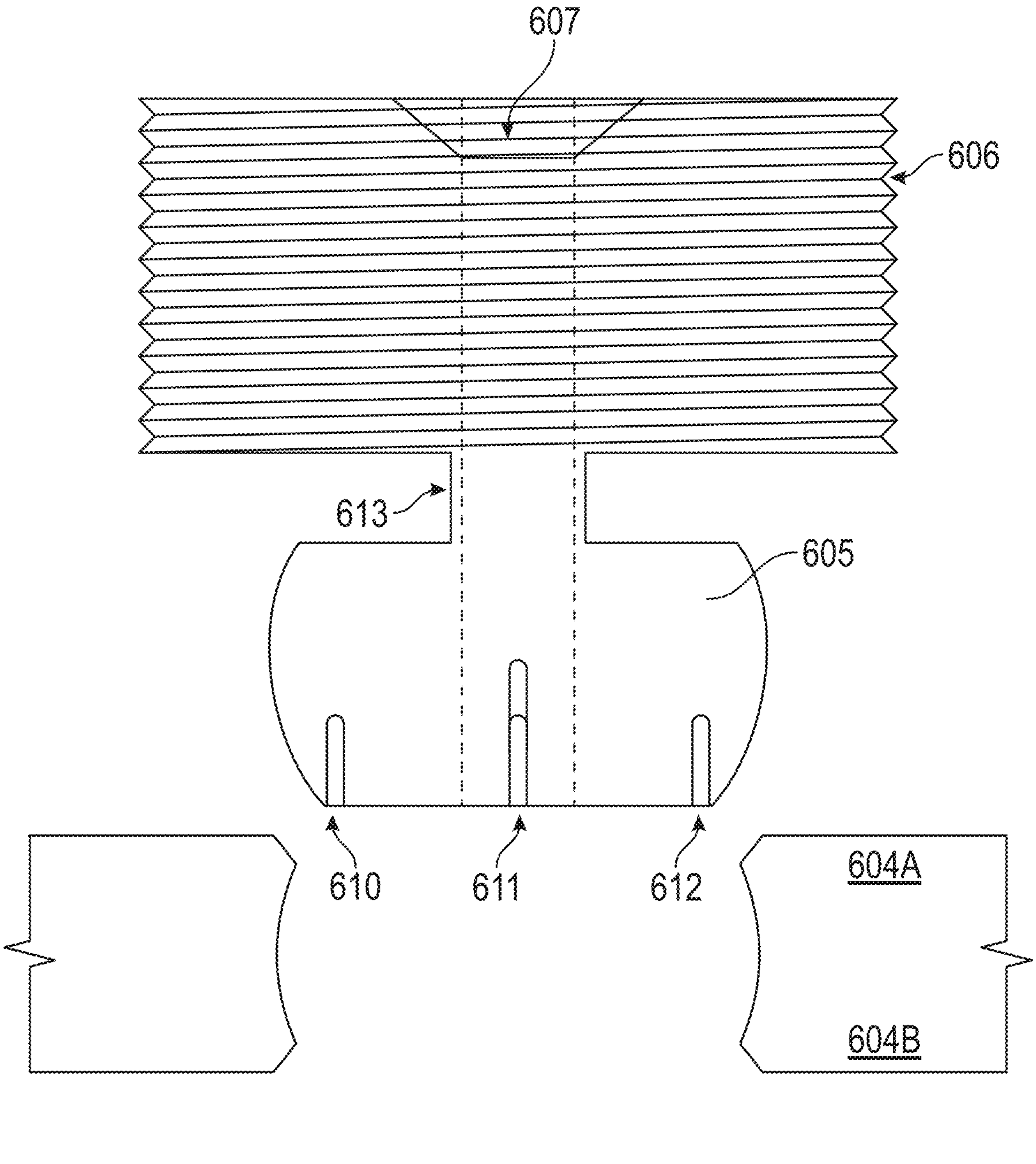
FIG. 6 shows a cutaway view of an alternative embodiment of the jamb jack.

FIG. 6 illustrates an alternative embodiment of the jam jack device 100. In this embodiment, the ball 105 is replaced by a cut-off sphere 605. The cut-off sphere 605 is a sphere with geometry removed to create a flat surface at the bottom and a flat surface at the top. The volume of geometry that is removed can vary in different embodiments. In some embodiments, only the top or only the bottom has the geometry removed from the sphere. In some embodiments, the bottom surface and the top surface of the cut-off sphere 605 are parallel. In other embodiments, the bottom surface and the top surface of the cut-off sphere 605 are not parallel. In some embodiments, the bottom surface and the top surface of the cut-off sphere 605 are perpendicular to the neck 613.

The cut-off sphere 605 attaches to the adjustable component 606 through a neck 613. A hollow fastener chase 607 extends through the adjustable component 606, the neck 613, and the cut-off sphere 605, allowing a fastener 103 to extend through the adjustable component 606, the neck 613, the cut-off sphere 605, and into the rough framing 102. The adjustment component 606 and cut-off sphere 605 assembly screws into the base component 108, as seen in FIG. 1. In some embodiments, the neck length between the cut-off sphere 605 and the adjustable component 606 could be 12 mm. In some embodiments, the cut-off sphere 605 could have a 25 mm diameter. In some embodiments, the outside diameter of the adjustable component 606 could be 44 mm and the thickness of the adjustable component could be 19 mm.

The adjustment component 106 is threaded on the outside. The adjustment component 606 is attached to the cut-off sphere 605. The attachment could be made by being molded together, machined out of a single piece, glued together with an adhesive, welded together, 3-D printed as a single part, or through other attachment means. The cut-off sphere 605 is a sphere attached to the adjustment component 606, either directly or via a cylinder or neck 613, as shown in FIG. 6. The cut-off sphere 605 (and the cylinder and adjustment component 606) has a cylindrical, hollow fastener chase 607 in the center. The hollow fastener chase 607 receives the fastener 103, which passes through adjustment component 606 to be screwed into the rough framing 102. The adjustment component 606 and cut-off sphere 605 assembly could be made of steel, iron, brass, bronze, plastic, or similar material. In some embodiments, the inside diameter of the fastener chase 607 is 6 mm or less.

In some embodiments, the hollow fastener chase 607 is threaded. The threads in the fastener chase 607 could be through the entire adjustment component 606 and cut-off sphere 605 assembly in some embodiments, or could be partially threaded.

In some embodiments, the top of the adjustment component 606 is countersunk so that the fastener 103 is flush with the top of the adjustment component 606 as it passes through the fastener chase 607.

In some embodiments, the adjustment component 606 is screwed directly into the window or doorjamb 101, without the base component 108. In other embodiments, the adjustable component 606 is screwed into the base component 108.

The platform base 604A and 604B could be one or two pieces. The platform base 604A and 604B has a socket that envelopes the cut-off sphere 605 in such a manner that the platform base 604A, 604B can be rotated around the cut-off sphere 605. In some embodiments, the platform base 604A, 604B can be stiffly manipulated to move around the cut-off sphere 605, but not so loose that gravity will move the platform base 604A, 604B. The platform base 604A, 604B could be 3D printed (in plastic, nylon, steel, etc) around the cut-off sphere 605, the platform base 604A, 604B could be molded around the cut-off sphere 605, or the platform base 604A, 604B could be adhered together from a plurality of parts. For instance, platform base 604A top could slide over the cut-off sphere 605 and the platform base 604B bottom, and the two parts could be adhered together. The adhesion could be with an adhesive, with screws (or bolts), welded (metal or plastic), with a band around the pieces, or with similar attachment mechanisms. The platform base 604A, 604B could be made of steel, iron, brass, bronze, plastic, white metal, nylon, or similar material. In some embodiments, the platform base 604A could be 5 mm thick, and the platform base 604B could be 5 mm thick.

In other embodiments, the cut-off sphere 605 could have a plurality of slots 610, 611, 612 that permit the cut-off sphere 605 to compress as it is forced to snap into the platform base 604A, 604B.

The platform base 604A, 604B could be a rectangular box shape in some embodiments. In other embodiments, the platform base 604A, 604B could be round with a flat or concave or convex surface contacting the rough framing 102.

The Method of Installing the Jamb Jack Device

For one embodiment, in order to install the jamb jack device 100, a hole is placed in the window or door jamb 101. The base component 108 is inserted in the hole, and two screws are driven into the window or door jamb 101 through the screw holes 403*a*, 403*b* in the flanges 402*a*, 402*b*.

Next, the adjustment component 106 is screwed into the base component 108, providing the space difference required between the window or door jamb 101 and the rough framing 102. The platform base 104 is placed against the rough framing 102, and the adjustment component 106 is adjusted so that the platform base 104 rests firmly against the rough framing 102.

The fastener 103 is driven into the hollow 107 of the adjustment component 106 and the ball 105. The fastener 103 may continue through the ball 105 and into the rough framing 102.

While the present disclosure has been presented above with respect to the described and illustrated embodiments of the jamb jack device 100, it is to be understood that the disclosure is not to be limited to those alternatives and described embodiments. Accordingly, reference should be made primarily to the following claims rather than the foregoing description to determine the scope of the disclosure. All dimensions are by way of an example and could have a 20% tolerance.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present inventions include such changes and modifications.

The invention claimed is:

1. An apparatus comprising:

a cylindrical threaded adjustment component with a cylindrical surface on an interior wall and an adjustment component threads on an exterior wall, the cylindrical threaded adjustment component extending through a cylinder with an exterior surface to a cut-off sphere, the cylindrical surface extending through the cylinder and the cut-off sphere;

a platform base with a socket configured to encompass the cut-off sphere such that the platform base pivots around the cut-off sphere; and a jamb, the cylindrical threaded adjustment component mechanically connected to the jamb.

2. The apparatus of claim 1 further comprising a cylindrical threaded base component with guide threads on base component interior walls, the guide threads aligned to accept the adjustment component threads.

3. The apparatus of claim 2 wherein a flange is mechanically attached to the cylindrical threaded base component at one end of the cylindrical threaded base component, the flange extending outward, the flange including a flat surface perpendicular to the cylindrical threaded base component.

4. The apparatus of claim 3 wherein the flange has a hole in the flat surface of the flange.

5. The apparatus of claim 2 wherein the cylindrical threaded base component has exterior threads.

6. The apparatus of claim 1 wherein the cylindrical threaded adjustment component, the cylinder, and the cut-off sphere are a single piece of steel.

7. The apparatus of claim 1 wherein the platform base, the cylindrical threaded adjustment component, the cylinder, and the cut-off sphere are 3-D printed plastic.

8. The apparatus of claim 1 wherein the platform base is nylon.

9. The apparatus of claim 1 wherein the jamb is a door jamb.

10. The apparatus of claim 1 wherein the jamb is a window jamb.

11. An apparatus comprising:

a cylindrical threaded base component with guide threads on a guide interior wall, the guide threads aligned to accept adjustment component threads;

an adjustment component assembly, the adjustment component assembly comprising:

a cylindrical threaded adjustment component with the adjustment component threads on an adjustment component exterior wall and a cylindrical surface on an adjustment component interior wall, a cylinder mechanically connected to the cylindrical threaded adjustment component on one end of the cylindrical threaded adjustment component, and a cut-off sphere, mechanically connected to the cylinder, the cylindrical surface extending through the cut-off sphere; and a platform base with a socket configured to encompass the cut-off sphere such that the platform base pivots around the cut-off sphere; and a jamb, the cylindrical threaded adjustment component mechanically connected to the jamb.

12. The apparatus of claim 11 wherein the platform base is a rectangular box shape.

13. The apparatus of claim 11 wherein a flange is mechanically attached to the cylindrical threaded base component at one end of the cylindrical threaded base component, the flange extending outward, the flange including a flat surface perpendicular to the cylindrical threaded base component.

14. The apparatus of claim 11 wherein the cylindrical threaded base component has exterior threads.

15. The apparatus of claim 11 wherein the cylindrical threaded adjustment component, the cylinder, and the cut-off sphere are a single piece of brass.

16. The apparatus of claim 11 wherein the platform base, the cylindrical threaded adjustment component, the cylinder, and the cut-off sphere are 3-D printed steel.

17. The apparatus of claim 11 wherein the platform base is iron.

18. The apparatus of claim 11 wherein the jamb is a door jamb.

19. The apparatus of claim 11 wherein the jamb is a window jamb.

20. The apparatus of claim 11 wherein the jamb is an appliance jamb.

* * * * *